(12) United States Patent
Ng et al.

(10) Patent No.: US 11,791,908 B2
(45) Date of Patent: Oct. 17, 2023

(54) SYSTEMS AND METHODS FOR TESTING MULTIPLE MMWAVE ANTENNAS

(71) Applicant: Apple Inc., Cupertino, CA (US)

(72) Inventors: Sze Yang Dennis Ng, Sunnyvale, CA (US); Jr-Yi Shen, Saratoga, CA (US); Harish Rajagopalan, San Jose, CA (US)

(73) Assignee: APPLE INC., Cupertino, CA (US)

( * ) Notice: Subject to any disclaimer, the term of this patent is extended or adjusted under 35 U.S.C. 154(b) by 37 days.

(21) Appl. No.: 17/335,607

(22) Filed: Jun. 1, 2021

(65) Prior Publication Data

US 2022/0385378 A1 Dec. 1, 2022

(51) Int. Cl.
*H04B 17/10* (2015.01)
*H04B 7/0408* (2017.01)
*H01Q 15/14* (2006.01)

(52) U.S. Cl.
CPC ........... *H04B 17/101* (2015.01); *H01Q 15/14* (2013.01); *H04B 7/0408* (2013.01)

(58) Field of Classification Search
CPC .................................................... H04B 17/101
See application file for complete search history.

(56) References Cited

U.S. PATENT DOCUMENTS

| | | | |
|---|---|---|---|
| 7,915,909 B2 | 3/2011 | Dunn et al. | |
| 8,797,211 B2 | 8/2014 | Valdes-Garcia | |
| 9,319,908 B2 | 4/2016 | Nickel et al. | |
| 10,063,328 B1* | 8/2018 | Brinkoetter | B64C 27/006 |
| 10,079,435 B1* | 9/2018 | Minko | G01S 3/14 |
| 10,306,494 B2 | 5/2019 | Foegelle | |
| 2006/0199543 A1* | 9/2006 | Spirtus | H04B 17/20 |
| | | | 455/67.11 |
| 2017/0194706 A1* | 7/2017 | Lee | H04B 7/0619 |

* cited by examiner

*Primary Examiner* — Hsinchun Liao
(74) *Attorney, Agent, or Firm* — Fletcher Yoder, P.C.

(57) ABSTRACT

A testing system may include a test electronic device having a test antenna disposed in a first signal path of a first antenna array of an electronic device. The test antenna may receive a first signal from the first antenna array. The testing system may also include a reflector disposed in a second signal path of a second antenna array of the electronic device. The reflector may reflect a second signal from the second antenna array to the test antenna. The reflector may include a flat, parabolic, or elliptical curvature that reflects a radio frequency signal emitted by the second antenna array to the test antenna.

19 Claims, 12 Drawing Sheets

SYSTEMS AND METHODS FOR TESTING MULTIPLE MMWAVE ANTENNAS

BACKGROUND

The present disclosure relates generally to test equipment, and more specifically to testing multiple radio frequency antennas that are located in different areas of an electronic device.

Test equipment may include multiple test antennas that conduct over-the-air (OTA) testing of multiple, separately located radio frequency (RF) antennas or antenna arrays (e.g., capable of millimeter wave (mmWave) transmission and/or reception) of an electronic device. In particular, each test antenna may be disposed in a signal path of a respective device antenna or antenna array to receive an emitted RF signal from the respective device antenna or antenna array for testing purposes. However, it may prove expensive to utilize multiple test antennas to test the multiple antennas or antenna arrays of the electronic device and, further, may prove inefficient and inconsistent when repeatedly arranging the multiple test antennas to properly receive the emitted RF signals from the device antennas or antenna arrays to test electronic device after electronic device in a manufacturing environment.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a testing system may include a test electronic device including a test antenna. The test antenna may be disposed in a first signal path of a first antenna of an electronic device and receive a first signal from the first antenna. The testing system may further include a reflector. The reflector may be disposed in a second signal path of a second antenna of the electronic device and reflect a second signal from the second antenna to the test antenna.

In another embodiment, a method for operating a testing system may include positioning a test antenna of the testing system in a signal path of a first antenna of an electronic device. The method may also include directing the test antenna along a first axis based on a first path loss between the first antenna, a second antenna, and a third antenna of the electronic device. The method may also include directing the test antenna along a second axis based on a second path loss between the second antenna and the third antenna. The method may also include receiving, at the test antenna, a first beam from the first antenna, a second beam from the second antenna via a first reflector of the testing system, and a third beam from the third antenna via a second reflector of the testing system.

In yet another embodiment, a reflector of a testing system may include a surface to reflect a signal from an antenna of an electronic device, the surface including a surface roughness. The reflector may further include a curvature to reflect the signal to a test antenna of the testing system. The reflector may pivotably mount to an arm, and the arm may be disposed within a testing chamber of the testing system.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

Figure 1:
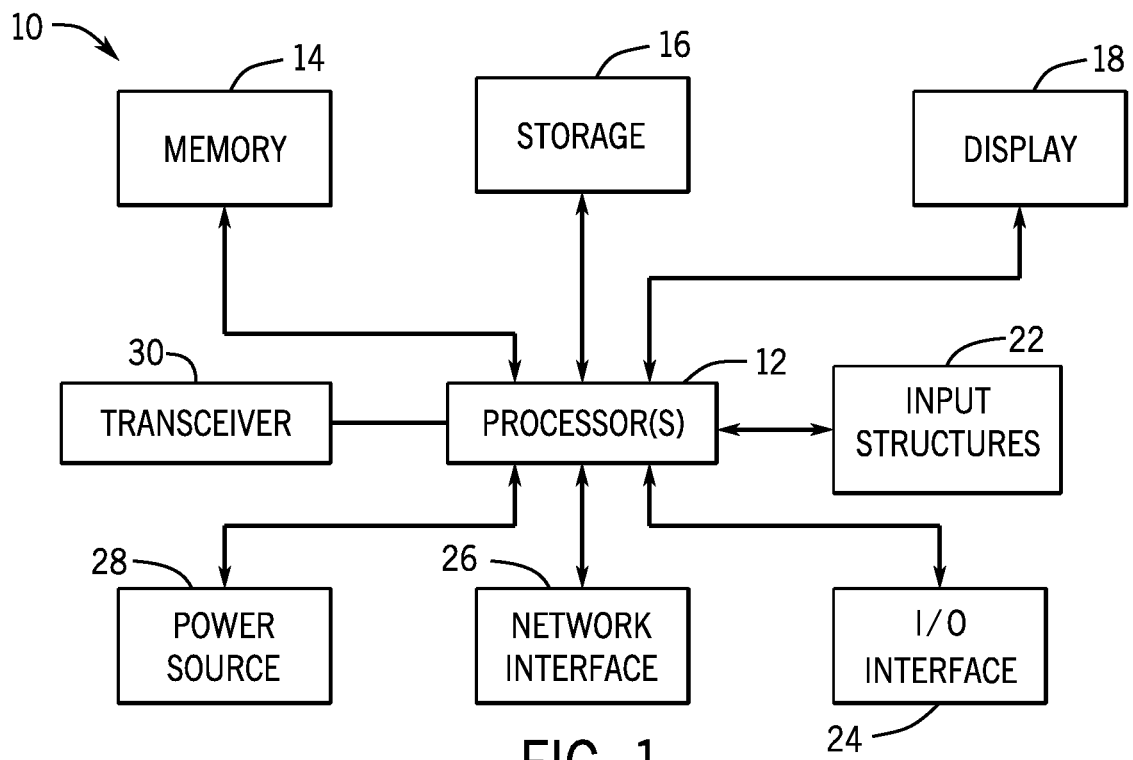
FIG. 1 is a block diagram of an electronic device, according to an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the term "approximately," "near," "about", and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on).

An electronic device may include multiple antennas and/or multiple antenna arrays. Further references to "an antenna" in this disclosure may include both a single antenna and an antenna array having multiple antennas. Each antenna emits radio frequency (RF) signals to transmit or receive data over-the-air (OTA). During manufacturing, the antennas of the electronic devices may be tested to ensure that they are working properly. In some cases, to test the multiple antennas, multiple test antennas of test equipment may receive RF signals from the multiple antennas of the electronic device. Each test antenna may be positioned in a signal path of a respective antenna of the electronic device to sufficiently capture the emitted RF signal from the respective antenna.

However, testing in this manner may prove expensive, inefficient, and inconsistent. Each test antenna is a specialized antenna that may be expensive to purchase and maintain. Furthermore, the orientation and set up of multiple testing systems with multiple test antennas may lead to inconsistent performance due to variances in configuring each test antenna and testing system. Moreover, additional variance may be introduced when testing different types of electronic devices with numbers of antennas and/or antenna locations.

The presently disclosed embodiments include one or more reflectors used in combination with one or more test antennas to test the antennas of electronic devices. Each reflector may include a metal-plated surface with a particular surface roughness. The test antenna may be positioned in a signal path of a first antenna (or antenna array) of the electronic device to receive RF signals emitted from the first antenna. The one or more reflectors may each be positioned to reflect the RF signals emitted from one or more antennas (or antenna arrays) of the electronic device to the test antenna.

In some embodiments, a curvature of each reflector may increase or maximize an amount of RF signal captured by the test antenna to decrease or minimize energy loss. In particular, the curvature of a reflector may be flat, parabolic, or elliptical, where each curvature may provide a different focus of a respective RF signal when reflecting the respective RF signal to a test antenna. In additional or alternative embodiments, the surface roughness of a metal making up a reflector may be configured, designed, or decreased to provide better reflective behavior to prevent or decrease signal loss when reflecting an RF signal.

As discussed above, orientating and aligning multiple test antennas when testing multiple electronic devices may lead to inconsistent test results due to variances in setting up each test antenna. However, the presently disclosed embodiments provide systems and processes for consistent and efficient positioning of the alignment of the test antenna and the reflectors by positioning the test antenna at a particular position, angle, and rotated orientation such that the signal or energy loss (e.g., path loss) is reduced or minimized between an RF signal received from the first antenna and other RF signals received from other antennas via reflectors. Moreover, while the disclosed embodiments are described as testing transmission of wireless signals by electronic devices, it should be understood that the techniques described herein are contemplated to also or alternatively apply to testing reception of wireless signals transmitted by the electronic devices.

Turning first to FIG. 1, an electronic device 10 according to an embodiment of the present disclosure may include, among other things, one or more processor(s) 12, memory 14, nonvolatile storage 16, a display 18, input structures 22, an input/output (I/O) interface 24, a network interface 26, a power source 28, and a transceiver 30. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in electronic device 10.

Figure 2:
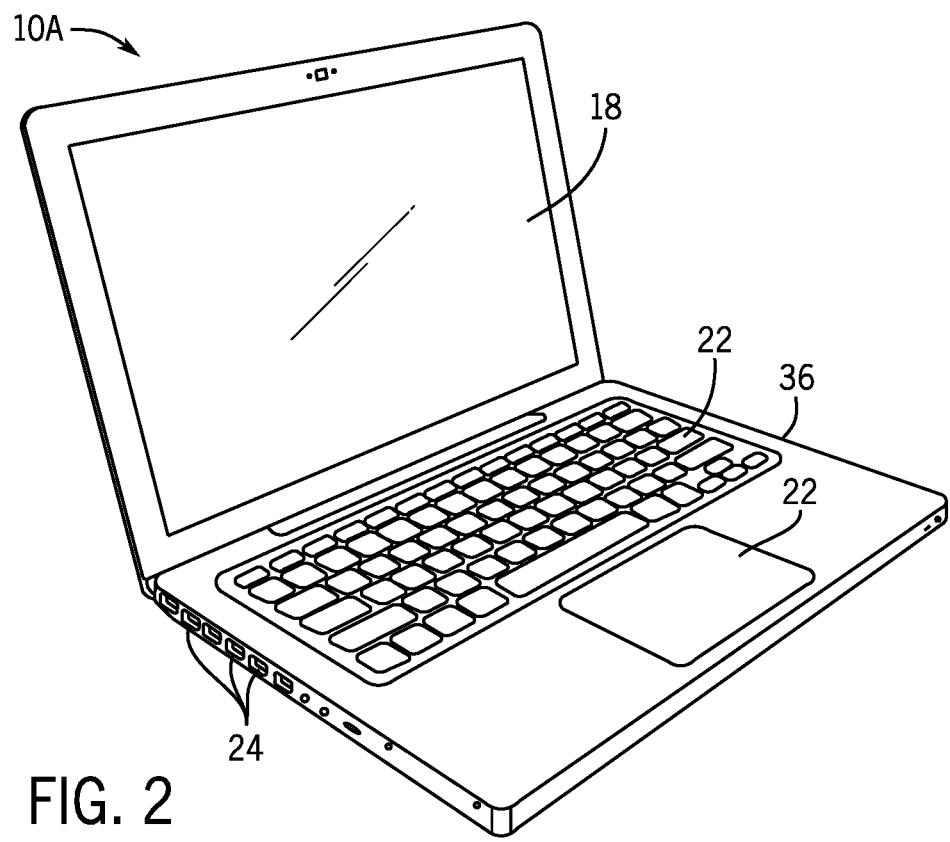
FIG. 2 is a perspective view of a notebook computer representing an embodiment of the electronic device of FIG. 1.
Figure 4:
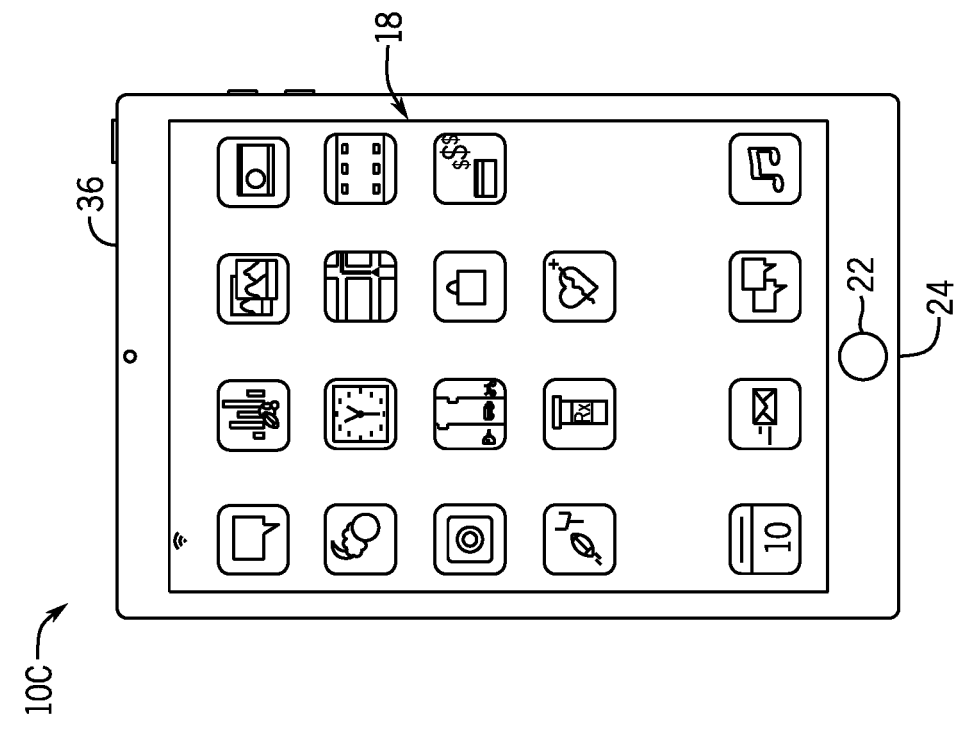
FIG. 4 is a front view of another handheld device representing another embodiment of the electronic device of FIG. 1.
Figure 3:
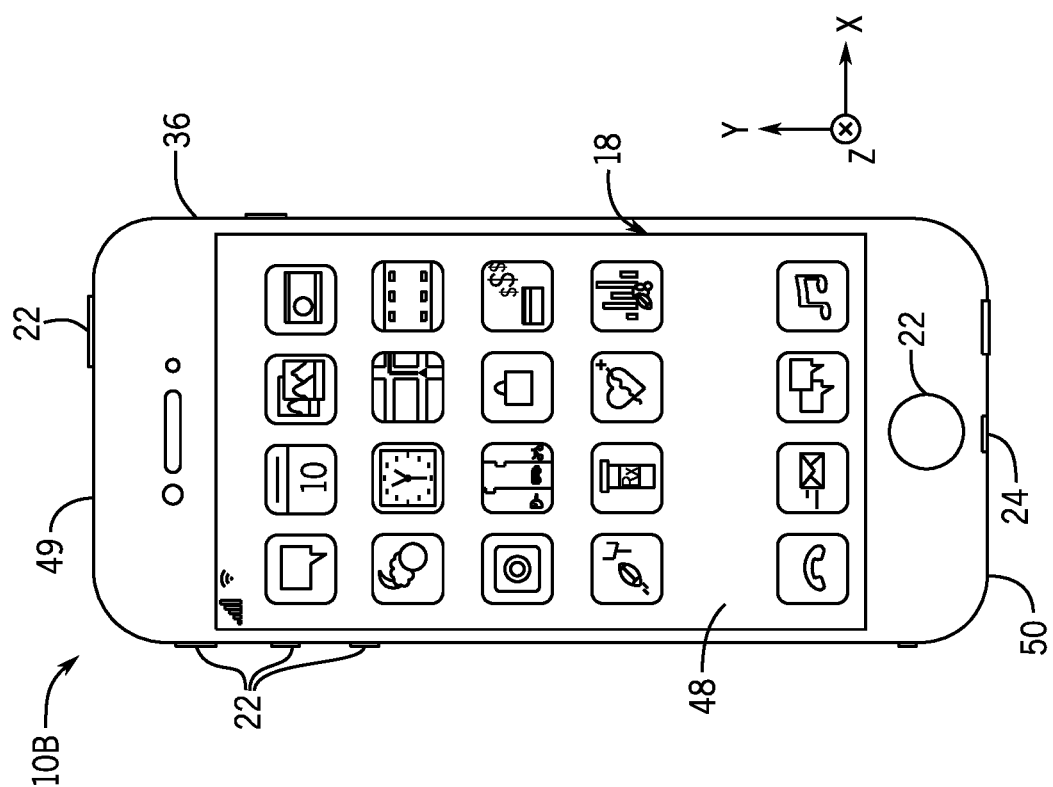
FIG. 3 is a front view of a handheld device representing another embodiment of the electronic device of FIG. 1.
Figure 5:
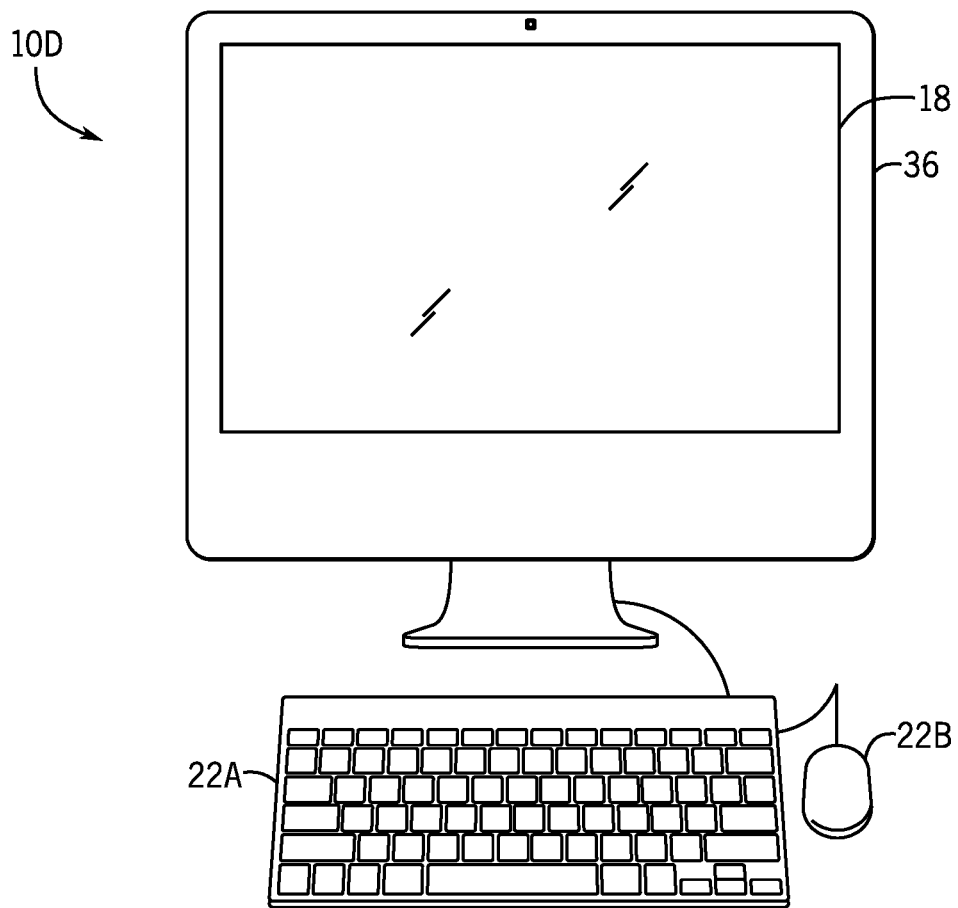
FIG. 5 is a front view of a desktop computer representing another embodiment of the electronic device of FIG. 1.
Figure 6:
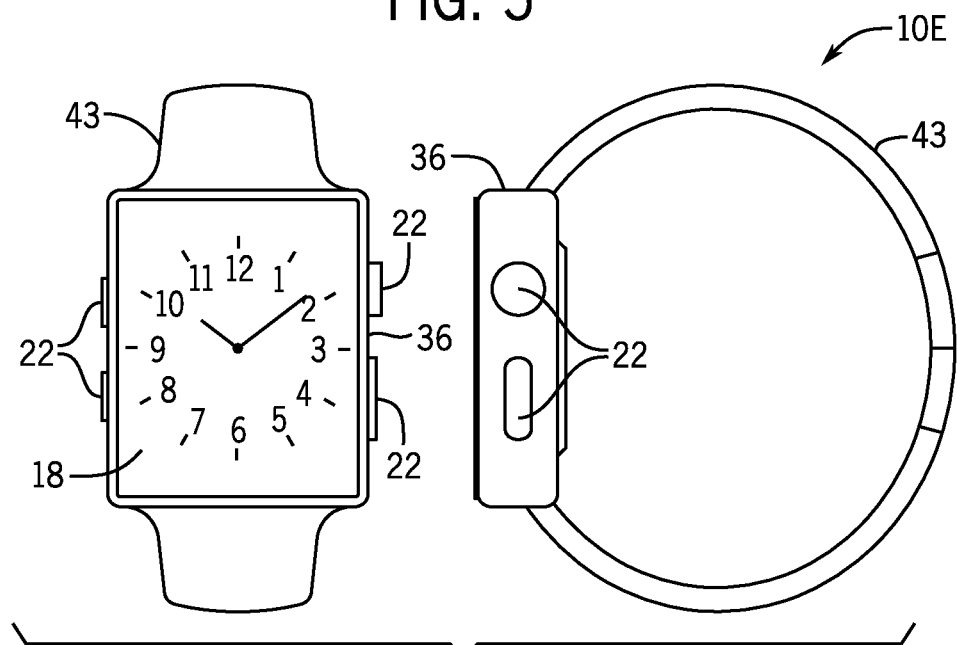
FIG. 6 is a front view and side view of a wearable electronic device representing another embodiment of the electronic device of FIG. 1.

By way of example, the electronic device 10 may represent a block diagram of the notebook computer depicted in FIG. 2, the handheld device depicted in FIG. 3, the handheld device depicted in FIG. 4, the desktop computer depicted in FIG. 5, the wearable electronic device depicted in FIG. 6, or similar devices. It should be noted that the processor(s) 12 and other related items in FIG. 1 may be embodied wholly or in part as software, firmware, hardware, or any combination thereof. Furthermore, the processor(s) 12 and other related items in FIG. 1 may be a single contained processing module or may be incorporated wholly or partially within any of the other elements within the electronic device 10.

In the electronic device 10 of FIG. 1, the processor(s) 12 may be operably coupled with a memory 14 and a nonvolatile storage 16 to perform various algorithms. Such programs or instructions executed by the processor(s) 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor(s) 12 to enable the electronic device 10 to provide various functionalities.

In certain embodiments, the display 18 may be a liquid crystal display (LCD), which may allow users to view images generated on the electronic device 10. In some embodiments, the display 18 may include a touch screen, which may allow users to interact with a user interface of the electronic device 10. Furthermore, it should be appreciated that, in some embodiments, the display 18 may include one or more organic light emitting diode (OLED) displays, or some combination of LCD panels and OLED panels.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. The network interface 26 may include, for example, one or more interfaces for a personal area network (PAN), such as a Bluetooth network, for a local area network (LAN) or wireless local area network (WLAN), such as an 802.11x Wi-Fi network, and/or for a wide area network (WAN), such as a 3rd generation (3G) cellular network, universal mobile telecommunication system (UMTS), 4th generation (4G) cellular network, long term evolution (LTE) cellular network, long term evolution license assisted access (LTE-LAA) cellular network, 5th generation (5G) cellular network, and/or 5G New Radio (5G NR) cellular network. In particular, the network interface 26 may include, for example, one or more interfaces for using a Release-15 cellular communication standard of the 5G specifications that include the millimeter wave (mmWave) frequency range (e.g., 24.25-300 GHz). The transceiver 30 of the electronic device 10, which includes a transmitter and a receiver, may allow communication over the aforementioned networks (e.g., 5G, Wi-Fi, LTE-LAA, and so forth).

The network interface 26 may also include one or more interfaces, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra-Wideband (UWB), alternating current (AC) power lines, and so forth. As further illustrated, the electronic device 10 may include a power source 28. The power source 28 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may include computers that are generally portable (such as laptop, notebook, and tablet computers) as well as computers that are generally used in one place (such as conventional desktop computers, workstations, and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 10A, is illustrated in FIG. 2 in accordance with one embodiment of the present disclosure. The depicted computer 10A may include a housing or enclosure 36, a display 18, input structures 22, and ports of an I/O interface 24. In one embodiment, the input structures 22 (such as a keyboard and/or touchpad) may be used to interact with the computer 10A, such as to start, control, or operate a graphical user interface (GUI) or applications running on computer 10A. For example, a keyboard and/or touchpad may allow a user to navigate a user interface or application interface displayed on display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPod® or iPhone® available from Apple Inc. of Cupertino, Calif. The handheld device 10B may include an enclosure 36 to protect interior components from physical damage and to shield them from electromagnetic interference. The enclosure 36 may surround the display 18. The I/O interfaces 24 may open through the enclosure 36 and may include, for example, an I/O port for a hardwired connection for charging and/or content manipulation using a standard connector and protocol, such as the Lightning connector provided by Apple Inc., a universal serial bus (USB), or other similar connector and protocol.

User input structures 22, in combination with the display 18, may allow a user to control the handheld device 10B. For example, the input structures 22 may activate or deactivate the handheld device 10B, navigate user interface to a home screen, a user-configurable application screen, and/or activate a voice-recognition feature of the handheld device 10B. Other input structures 22 may provide volume control, or may toggle between vibrate and ring modes. The input structures 22 may also include a microphone that may obtain a user's voice for various voice-related features, and a speaker that may enable audio playback and/or certain phone capabilities. The input structures 22 may also include a headphone input that may provide a connection to external speakers and/or headphones.

FIG. 4 depicts a front view of another handheld device 10C, which represents another embodiment of the electronic device 10. The handheld device 10C may represent, for example, a tablet computer, or one of various portable computing devices. By way of example, the handheld device 10C may be a tablet-sized embodiment of the electronic device 10, which may be, for example, a model of an iPad® available from Apple Inc. of Cupertino, Calif.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook®, or other similar device by Apple Inc. It should be noted that the computer 10D may also represent a personal computer (PC) by another manufacturer. A similar enclosure 36 may be provided to protect and enclose internal components of the computer 10D such as the display 18. In certain embodiments, a user of the computer 10D may interact with the computer 10D using various peripheral input structures 22, such as the keyboard 22A or mouse 22B, which may connect to the computer 10D.

Similarly, FIG. 6 depicts a wearable electronic device 10E representing another embodiment of the electronic device 10 of FIG. 1 that may be configured to operate using the techniques described herein. By way of example, the wearable electronic device 10E, which may include a wristband 43, may be an Apple Watch® by Apple Inc. However, in other embodiments, the wearable electronic device 10E may include any wearable electronic device such as, for example, a wearable exercise monitoring device (e.g., pedometer, accelerometer, heart rate monitor), or other device by another manufacturer. The display 18 of the wearable electronic device 10E may include a touch screen display 18 (e.g., LCD, OLED display, active-matrix organic light emitting diode (AMOLED) display, and so forth), as well as input structures 22, which may allow users to interact with a user interface of the wearable electronic device 10E.

Figure 7:
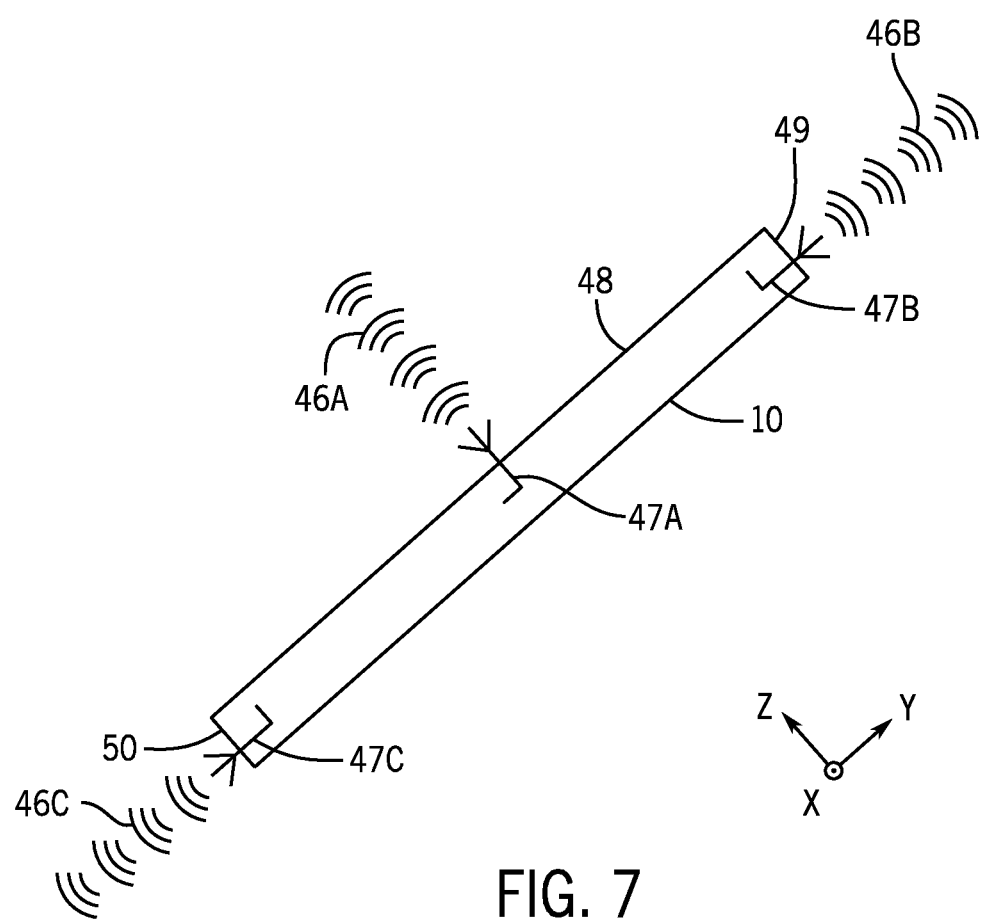
FIG. 7 is a perspective diagram of the electronic device of FIG. 1 having three antenna arrays, according to an embodiment of the present disclosure.

With the foregoing in mind, FIG. 7 is a perspective diagram of the electronic device 10 having three antenna arrays 47A-C, according to embodiments of the present disclosure. As discussed above, while three antenna arrays 47A-C are shown in the electronic device 10, it should be understood that, in some embodiments, any one (or more) of the antenna arrays 47-C may be replaced with a single antenna. Moreover, going forward, an individual antenna array (e.g., antenna array 47A) or a single antenna implementation may be generically referred to as an antenna array 47, an antenna 47, or an antenna group 47 for convenience. The electronic device 10 may include the transceiver 30 that may support transmission and receipt of various wireless signals over mmWave frequencies (e.g., 24.25-300 gigahertz (GHz)) via the one or more antenna arrays 47. To be clear, while an antenna array 47 is described as transmitting or receiving a wireless signal over an mmWave frequency, in some embodiments, a single antenna may transmit or receive a wireless signal over an mmWave frequency. The antenna arrays 47 may be configured in an omnidirectional or directional configuration, in a single-beam, dual-beam, or multi-beam arrangement, and so on. Each antenna array 47 may be associated with a one or more beams and various configurations. In some embodiments, each antenna array 47 may correspond to a respective transceiver 30 and emit radio frequency signals that may constructively and/or destructively combine to form a beam or RF signal 46A-C (collectively 46). The electronic device 10 may include multiple transmitters, multiple receivers, multiple transceivers, and/or multiple antennas as suitable for various communication standards. For reference purposes, it should be understood that each antenna array 47 may emit a boresight beam (e.g., a beam emitted along an axis of maximum gain (maximum radiated power) of the antenna array 47, a beam emitted along an axis of symmetry of the antenna array 47, and so on). The electronic device 10 may include multiple transmitters, multiple receivers, multiple transceivers, and/or multiple antennas as suitable for various communication standards. It should be noted that, going forward, an antenna array 47 may be referenced to as an antenna 47 or antenna group for convenience, and may include one or more antennas.

As illustrated, a first antenna 47A may emit a first beam 46A from a first surface 48 of the electronic device 10. The first surface 48 may include a front or a display surface (e.g., a surface having the display 18). For example, the first surface 48 may be a surface in the positive Z-axis direction, as illustrated in both FIGS. 3 and 7. Additionally, a second antenna 47B disposed at a second surface 49 of the electronic device 10 may emit a second beam 46B. The second surface 49 may include a surface in the positive Y-axis direction, as illustrated in both FIGS. 3 and 7 (e.g., a top surface of the electronic device 10A when a user is holding the electronic device 10 in a portrait mode or vertical position). A third antenna 47C disposed at a third surface 50 of the electronic device 10 may emit a third beam 46C. The third surface 50 may include a surface in the positive Z-axis direction, as illustrated in both FIGS. 3 and 7 (e.g., a bottom surface of the electronic device 10A when a user is holding the electronic device 10 in a portrait mode or vertical position). While the electronic device 10 shown in FIG. 7 is illustrated as having three antennas 47 at the first surface 48, the second surface 49, and the third surface 50 of the electronic device 10, it should be understood that, in additional or alternative embodiments, the electronic device 10 may include more or less antennas 47, at more, less, or different locations of the electronic device 10. For instance, in some embodiments, the electronic device 10 may include an antenna 47 at a side edge of the electronic device 10.

In some embodiments, the antennas 47 of the electronic device 10 may undergo testing during manufacturing by, for example, measuring the beams 46 and/or characteristics of the beams 46, to ensure that the antennas 47 are functioning properly. Indeed, test equipment may include multiple test antennas to receive RF signals from the multiple antennas of the electronic device. Each test antenna may be positioned in a signal path of a respective antenna of the electronic device to sufficiently capture the emitted RF signal from the respective antenna. However, testing in this manner may prove expensive, inefficient, and inconsistent. In particular, each test antenna may include a specialized antenna that is expensive to purchase and maintain.

Figure 8:
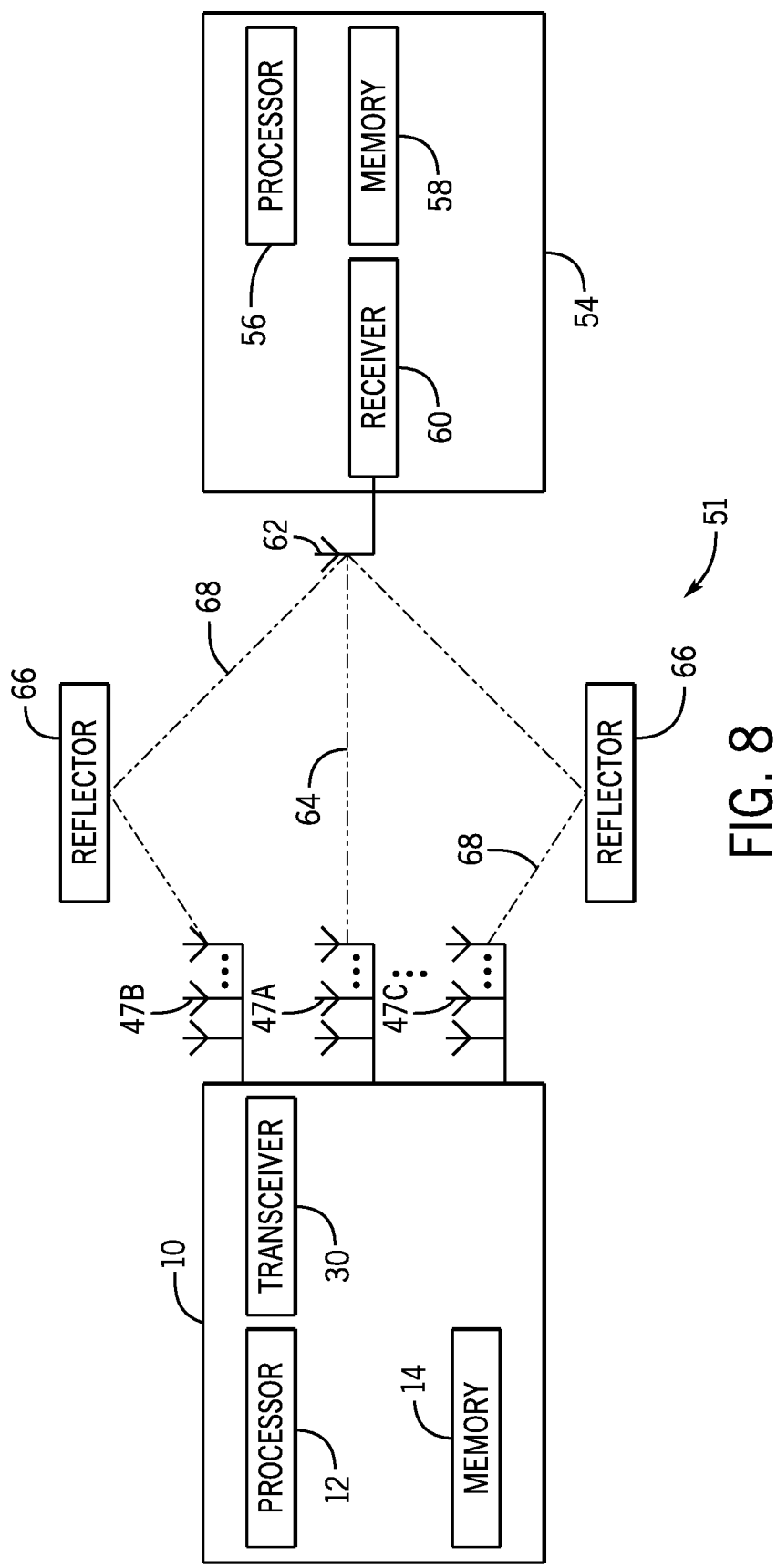
FIG. 8 is a block diagram of a testing system that tests antennas of the electronic device of FIG. 1, according to an embodiment of the present disclosure.

With the foregoing in mind, FIG. 8 is a block diagram of a testing system 51, according to an embodiment of the present disclosure. As illustrated, the electronic device 10 (which may be referred to as a device-under-test (DUT)) may be placed in the testing system 51 The testing system 51 may further include a test electronic device 54 (e.g., test equipment) having, among other things, processing circuitry (e.g., a processor 56), memory 58, a receiver 60, and one or more test antennas 62. The processor 56 may include the attributes described above with respect to the processor 12 of the electronic device 10, and the memory 58 may include the attributes described above with respect to the memory 14 of the electronic device 10. The one or more test antennas 62 (collectively referred to as a test antenna 62) may include a horn antenna (e.g., a dual polarized horn antenna), a dish antenna (e.g., a reflector antenna), a slot antenna, or any other suitable antenna for receiving RF signals, including mmWave frequencies. For example, the test antenna 62 may operate between 20 gigahertz (GHz) and 40 GHz and may have a gain between 8 decibels (dB) and 10 db. In some embodiments, the receiver 60 may be part of a transceiver that also includes a transmitter. The receiver 60 may receive RF signals from the electronic device 10 via the test antenna 62.

Figure 9:
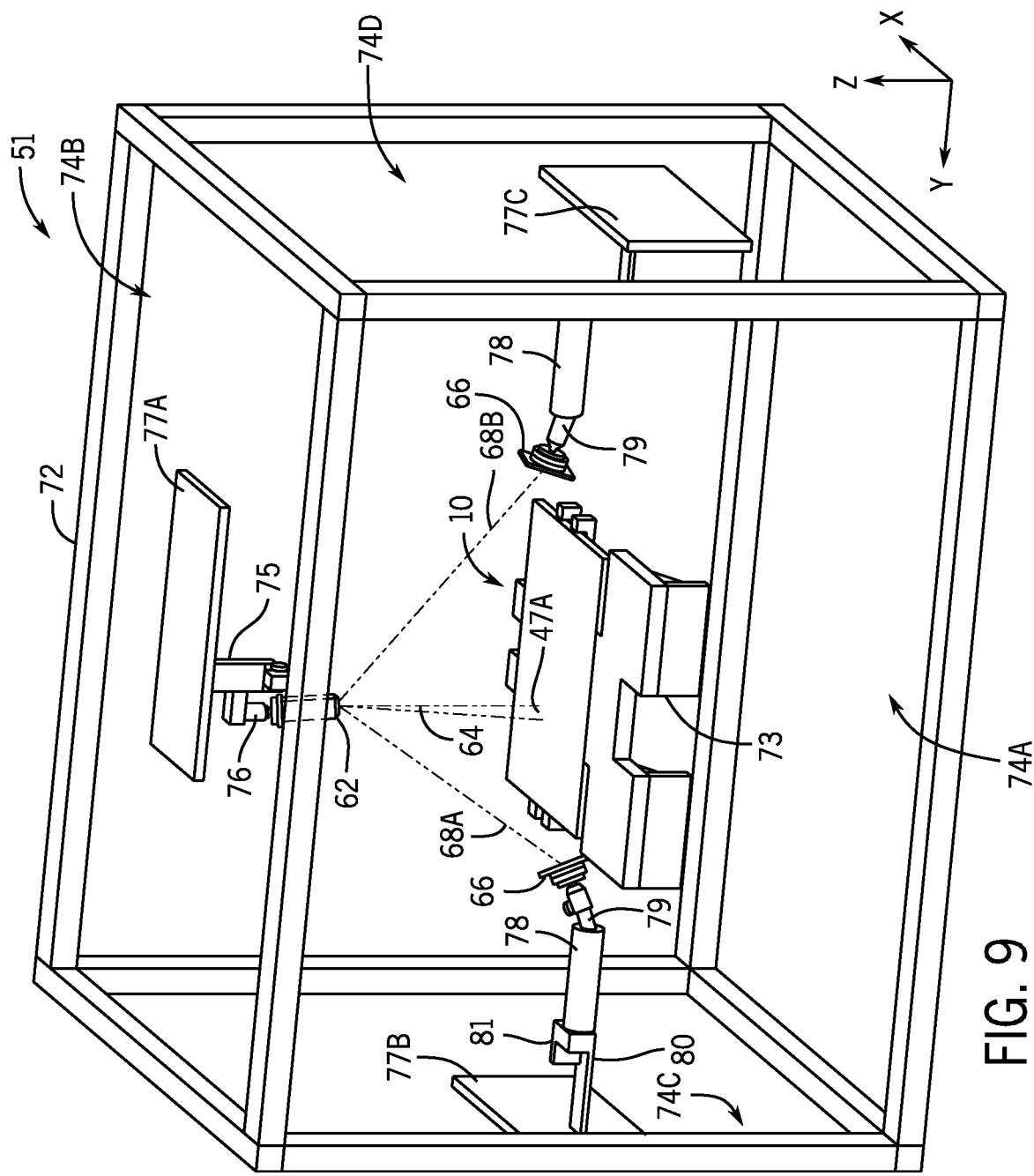
FIG. 9 is a perspective diagram of the testing system of FIG. 8, according to an embodiment of the present disclosure.

To better illustrate the physical characteristics of the testing system 51, FIG. 9 is a perspective diagram of the testing system 51, according to an embodiment of the present disclosure. The testing system 51 may include a chamber 72 that secures the multiple components (e.g., the test antenna 62, the reflectors 66, the electronic device 10, etc.) of the testing system 51 discussed in FIG. 8, and decreases or prevents interference of the RF signals emitted from the antennas 47 of the electronic device and received at the test antenna 62 and/or the reflectors 66. The chamber 72 may be metal, plastic, or any material strong enough to secure the components of the testing system 51, and enable accurate measurements of RF signals. The electronic device 10 may be mounted to a base or mounting plate 73 that is affixed to a surface 74A (e.g., a side surface in the negative X-axis direction) of the chamber 72. The mounting plate 73 may keep the electronic device 10 in a constant position while testing is performed.

The test antenna 62 may be pivotably mounted to a base 75 that enables the test antenna 62 to pivot (e.g., 360 degrees). Any suitable joint or device, or number of joints or devices (e.g., a hinge joint, a ball-and-socket joint, a combination of one or more hinge joints and one or more ball-and-socket joints), may enable the test antenna 62 to pivot respective to the base 74. In some embodiments, the test antenna 62 may include a ball joint at a mounting point, tail or root 76 of the test antenna 62, and the base 75 may include a socket for which the ball joint of the test antenna 62 engages to enable directing, angling, tilting, and/or rotating the test antenna 62. As discussed in more detail below, in some embodiments, the base 75 may include one or more actuators to enable the processor 56 of the test electronic device 54 to position, tilt, angle, and/or rotate the test antenna 62. The base 75 may itself be mounted to a removable plate 77A that is attached to a surface 74B (e.g., a top surface in the positive Z-axis direction) of the chamber 72 that is adjacent to the surface 74A. Moreover, the removable plate 77A and/or the base 75 may enable movement of the test antenna 62 in a lateral direction along the surface 74B of the chamber 72. In this manner, the removable plate 77A may be removed with the base 75 and the test antenna 62 attached to enable convenient adjustment of the test antenna 62.

Similarly, each reflector 66 may be pivotably mounted to a respective arm 78 that enables the respective reflector 66 to pivot (e.g., 360 degrees). Any suitable joint or device, or number of joints or devices (e.g., a hinge joint, a ball-and-socket joint, a combination of one or more hinge joints and one or more ball-and-socket joints), may enable a reflector 66 to pivot respective to an arm 78. In some embodiments, the test antenna 62 may include a ball joint at a mounting point, tail or root 79 of the reflector 66, and the arm 78 may include a socket for which the ball joint of the reflector 66 engages to enable directing, angling, tilting, and/or rotating reflector 66. Additionally or alternatively, the arm 78 may include one or more actuators to enable the processor 56 of the test electronic device 54 to position, tilt, angle, and/or rotate the reflector 66. Each arm 78 may itself be mounted to a respective removable plate 77B, 77C that is attached to a respective surface 74C, 74D (e.g., a respective side surface in the positive or negative Y-axis direction) of the chamber 72 that is adjacent to the surfaces 74A, 74B. In particular, the surface 74C may be opposite of the surface 74D to enable testing of the top and bottom antennas 47B, 47C of the electronic device 10. In this manner, a removable plate 77B, 77C may be removed with an arm 78 and reflector 66 attached to enable convenient adjustment of the reflector 66. As illustrated, the arm 78 may be further coupled to a second arm 80 via a pivotable joint (e.g., a hinge joint 81) that enables a higher degree of positioning of the reflector 66. While the perspective diagram illustrates the testing system 51 in a particular arrangement, different types of electronic devices 10, different types of reflectors 66, different types of antennas 47, and/or different types of test antennas 62 may be used, and may include different arrangements of the testing system 51.

RF signals transmitted from an antenna (e.g., a front-facing antenna 47A) of the electronic device 10 may traverse a direct signal path 64 to the test antenna 62 for testing purposes. In particular, the test antenna 62 may be positioned along a boresight of the antenna 47A (e.g., along an axis of maximum gain (maximum radiated power) of the antenna 47A, along an axis of symmetry of the antenna 47A, along a zero degree beam emitted from the antenna 47A, and so on). To test additional antennas of the electronic device 10 not disposed in the signal path 64, the test electronic device 54 may include one or more reflectors 66 to reflect RF signals transmitted from the additional antennas (e.g., 47B, 47C) via reflection signal paths 68A, 68B (collectively 68) to the test antenna 62. Each reflector 66 may be positioned along a boresight of a respective additional antenna 47B, 47C. In some embodiments, the test electronic device 54 may include multiple test antennas 62, where a first reflector 66 may reflect an RF signal from a first additional antenna (e.g., 47B) of the electronic device 10 via a first reflection signal path 68A to a first test antenna 62, and a second reflector 66 may reflect an RF signal from a second additional antenna (e.g., 47C) of the electronic device 10 via a second reflection signal path 68B to a second test antenna 62.

The reflectors 66 may be made of any suitable material, such as a metal, that has a surface roughness/resistance that sufficiently reflects RF signals 46. In particular, the effectiveness of the material to reflect specific frequencies of the RF signal 46 may be dependent upon the surface roughness of the material. The less rough or less resistant the material, the better reflective behavior of the material. Table 1 below illustrates the maximum frequency of an RF signal that may be reflected by the reflector 66 having a surface roughness listed in the table:

TABLE 1

| Maximum Frequency (gigahertz) | Surface Roughness (micrometer) |
| --- | --- |
| 28 | 75 |
| 43 | 49 |
| 87 | 24 |
| 220 | <1 |

In some embodiments, the reflector 66 may be plated in the material (e.g., in cases where the material has sufficient surface roughness but is expensive to manufacture the entire reflector 66 from the material). For example, gold has a surface roughness of approximately 1.6 micrometer (μm) and, as such, may sufficiently reflect RF signals having frequencies of approximately less than 200 gigahertz (GHz). As such, in some embodiments, the reflector 66 may be made of any suitable material (e.g., aluminum) and have gold-plating. In additional or alternative embodiments, the material of the reflector 66 may have a sufficient surface roughness to reflect RF signals of any suitable desired frequencies (e.g., less than or equal to 75 μm to reflect RF signals of less than or equal to 28 GHz, less than or equal to 49 μm to reflect RF signals of less than or equal to 43 GHz, less than or equal to 24 μm to reflect RF signals of less than or equal to 87 GHz, less than or equal to 1 μm to reflect RF signals of less than or equal to 200 GHz, and so on).

As should be noted, using the reflectors 66 to receive RF signals (e.g., from the top antenna 47B or the bottom antenna 46C as shown in FIG. 7) via the reflection signal paths 68 at the test antenna 62 may result in power gain loss of the signals compared to receiving the RF signals via the direct signal path 64 at the test antenna 62. For example, when the test antenna 62 is positioned 30 centimeters (cm) from the front-facing antenna 47A of the electronic device 10 along the direct signal path 64, the test antenna 62 may receive RF signals along the direct signal path 64 from the front-facing antenna 47A having a power gain of 10 decibels (dB). In comparison, the test antenna 62 may receive RF signals having frequencies in the n257 band (e.g., 26.5 GHz to 29.5 GHz) along the reflection signal paths 68 having a power gain of 4.5 decibel milliwatts (dBm) averaged over the top and bottom antennas 47B, 47C of the electronic device 10. As another example, the test antenna 62 may receive RF signals having frequencies in the n260 band (e.g., 37 GHz to 40 GHz) along the reflection signal paths 68 having a power gain of 3.5 dBm averaged over the top and bottom antennas 47B, 47C of the electronic device 10. As such, there may be a loss of power gain in the range of 5-7 dB along the reflection signal paths 68 using the reflector 66 compared to not using the reflector 66 along the direct signal path 64 (not accounting for free space loss).

Based on the receiver 60 receiving the RF signals 46 at the test antenna 62 from the antennas 47 (e.g., directly or via the reflectors 66), the processor 56 may measure characteristics of the RF signals 46, such as an amplitude, power, gain, signal strength, frequency, phase, noise level, signal-to-noise ratio, and so on. In some embodiments, the processor 56 may generate one or more reports based on the measured characteristics of the RF signals 46, and output (e.g., display, print out, send, transmit) the one or more reports for analysis. In additional or alternative embodiments, the processor 56 may store the measured characteristics of the RF signals 46 or data based on the measured characteristics in the memory 58 of the test electronic device 54, the memory 14 of the electronic device 10, and/or the storage 16 of the electronic device 10 (e.g., in a lookup table). For example, the memory 14 or the storage 16 of the electronic device 10 may store operating parameters (e.g., an input power, an input current, or any other suitable settings of a transmitter of the electronic device 10) for transmitting the RF signals 46. In particular, the operating parameters may correspond to standard characteristics of the RF signals 46 (e.g., when transmitted by a standard transmitter or a transmitter of a control group). The processor 56 may generate correction factors or coefficients based on the measured characteristics of the RF signals 46, such that the correction factors, when applied to the transmitter of the electronic device 10, compensate for differences between the standard characteristics of the RF signals 46 and the measured characteristics of the RF signals 46. The processor 56 may then cause the memory 14 or the storage 16 of the electronic device 10 to also store the correction factors. In one embodiment, the processor 56 may output (e.g., display, print out, send, transmit) differences between measured characteristics of the RF signals 46 and the standard characteristics of the RF signals 46.

Figure 10:
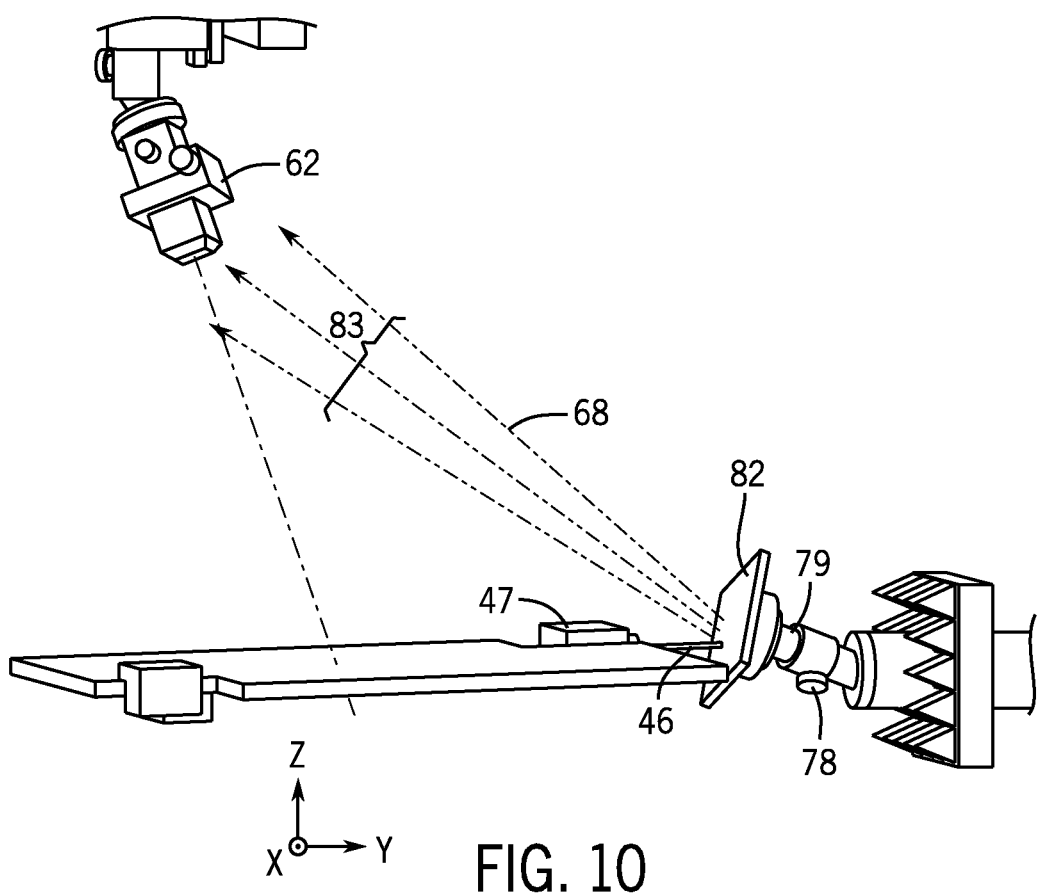
FIG. 10 is an illustrative diagram of a flat reflector of the testing system of FIG. 8, according to an embodiment of the present disclosure.

In addition to the material of the reflector 66, a curvature of the reflector 66 may enable focusing a reflected RF signal to better capture the signal and prevent or reduce energy loss. With the foregoing in mind, FIG. 10 is an illustrative diagram of a flat reflector 82 of the testing system 51, according to an embodiment of the present disclosure. The flat reflector 82 may include a flat surface made of or plated with the material described above (e.g., gold-plated).

The flat reflector 82 reflects the RF signal 46 emitted from the antenna 47 of the electronic device 10 in the reflection signal path 68 in a reflection pattern 83 to the test antenna 62. The reflection pattern 83 illustrates the focus or dispersion of the RF signal 46 along the reflection signal path 68. If the reflection signal path 68 is excessively long (e.g., greater than 5 centimeters (cm) greater than 10 cm, greater than 12 cm, greater than 15 cm, greater than 20 cm, and so on) then the reflection pattern 83 may include a conical pattern (e.g., with a point at the flat reflector 82) that scatters or disperses the RF signal 46 in the reflection signal path 68, such that receiving the RF signal 46 via the reflection signal path 68 may be inefficient and lead to signal or energy loss (e.g., path loss) when compared to the RF signal 46 received via the reflection signal path 68. The more focused the reflection pattern 83 is, the less path loss is experienced in the reflection signal path 68. For excessive reflection paths, the presently disclosed embodiments may implement other curvatures of the reflector 66 to prevent or decrease path loss.

Figure 11:
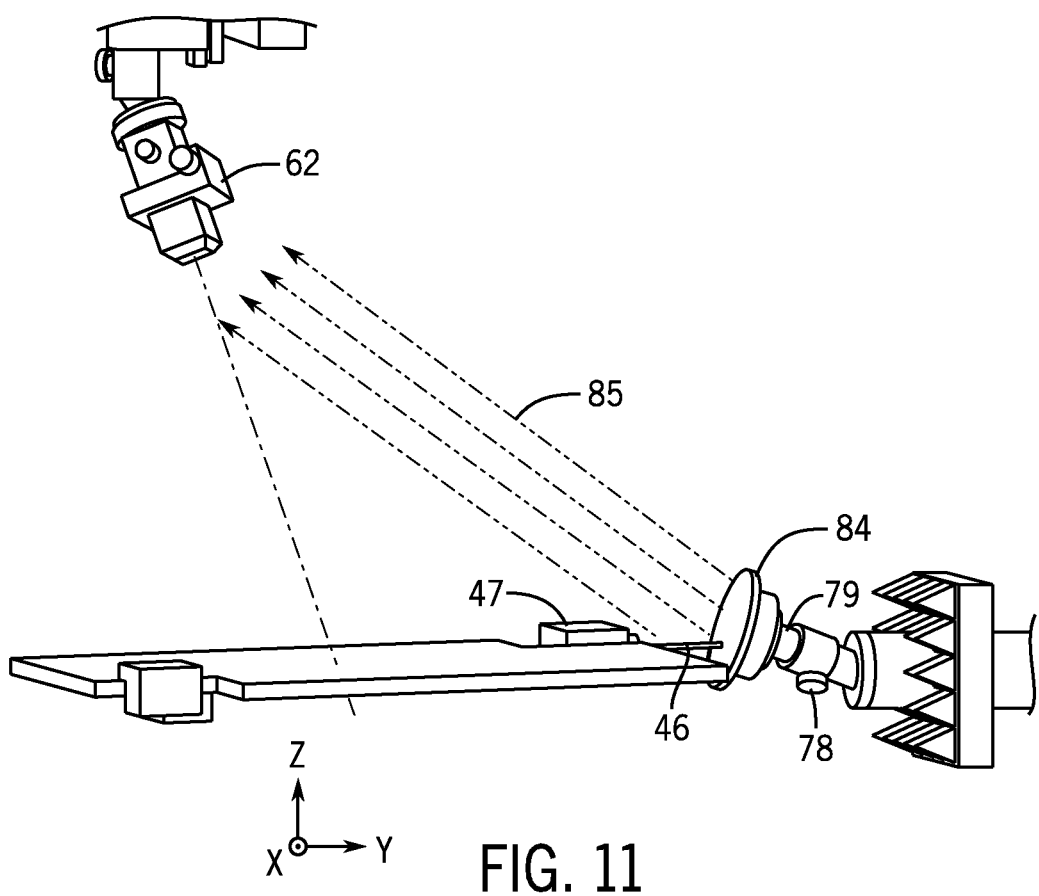
FIG. 11 is an illustrative diagram of a parabolic reflector of the testing system of FIG. 8, according to an embodiment of the present disclosure.

With the foregoing in mind, FIG. 11 in an illustrative diagram of a parabolic reflector 84 of the testing system 51, according to an embodiment of the present disclosure. The parabolic reflector 84 may include a parabolic-curved surface made of or plated with the materials described above (e.g., gold-plated). The parabolic reflector 84 reflects the RF signal 46 in a reflection pattern 85 in the reflection signal path 68 from the antenna 47 to the test antenna 62. The reflection pattern 85 may include a parallel pattern that facilitates focusing the RF signal 46 along the reflection signal path 68 at the test antenna 62, such that the RF signal 46 experiences less path loss than the conical reflection pattern 83 of the flat reflector 82 shown in FIG. 9.

Figure 12:
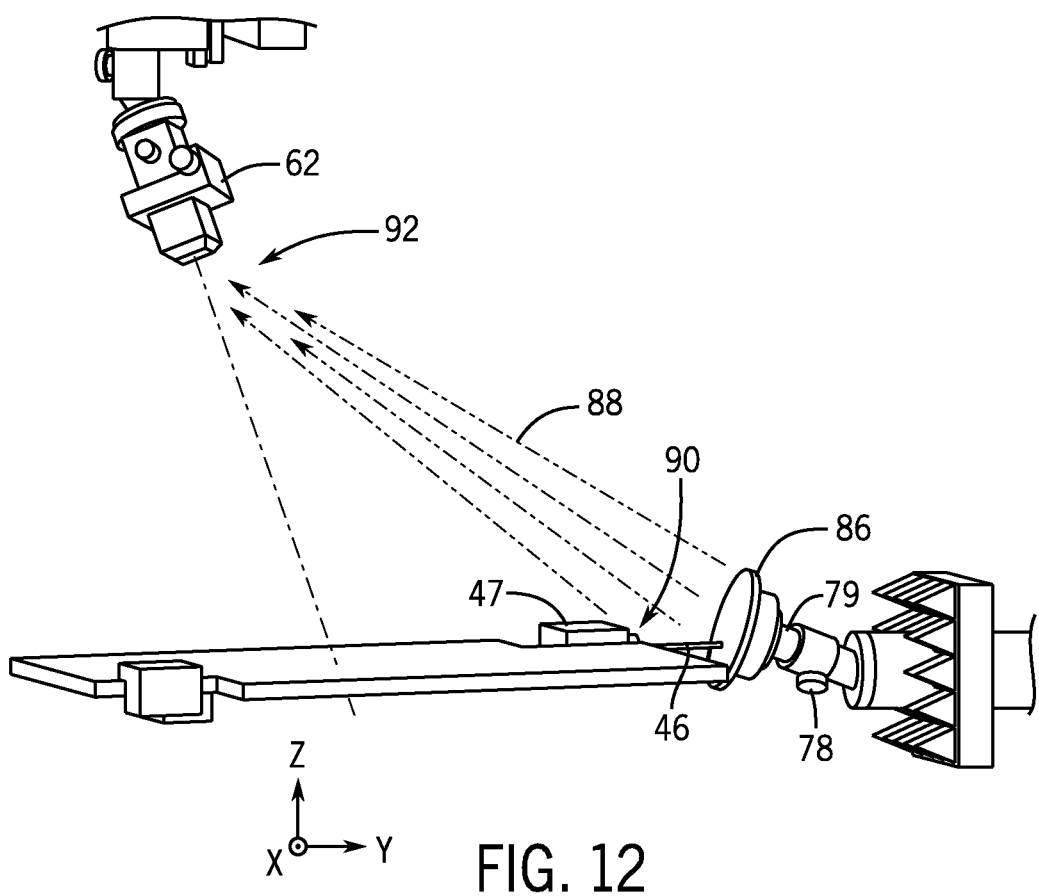
FIG. 12 is an illustrative diagram of an elliptical reflector of the testing system of FIG. 8, according to an embodiment of the present disclosure.

Additionally, FIG. 12 is an illustrative diagram of an elliptical reflector 86 of the testing system of FIG. 8, according to an embodiment of the present disclosure. The elliptical reflector 86 may be an elliptically-curved surface made of or plated with the materials described above (e.g., gold-plated). The elliptical reflector 86 reflects the RF signal 46 from the antenna 47 to the test antenna 62. The curvature of the elliptical reflector 86 is elliptical, which enables the elliptical reflector 86 to receive the RF signal 46 sent from a primary focal point 90 and focus it at a secondary focal point 92. It should be noted that the reflection pattern 88 is more focused at the test antenna 62 than any other pattern, and thus path loss in the RF signal 46 along the reflection signal path 68 received at the test antenna 62 would be decreased and/or minimized compared to the flat reflector 82 and/or the parabolic reflector 84.

Figure 13:
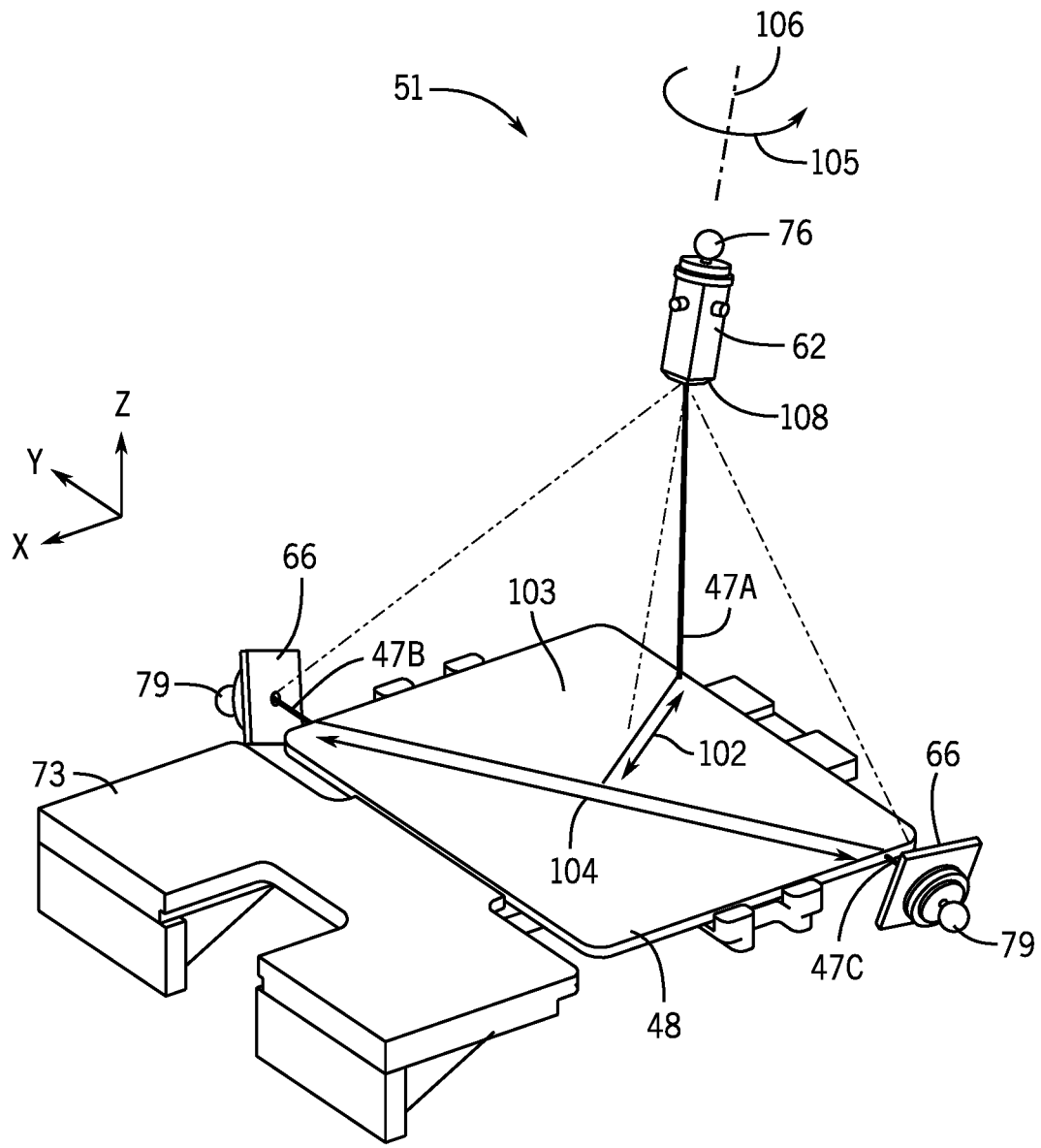
FIG. 13 is a perspective diagram of the testing system of FIG. 8 illustrating positioning and orienting a test antenna of the testing system of FIG. 8 to decrease path loss between antennas of the electronic device of FIG. 1 and a test antenna of the testing system of FIG. 8, according to an embodiment of the present disclosure.

By utilizing the reflectors 66 and the test antenna 62, thus avoiding the need to set-up one or more test antennas 62, the testing system 51 may be more efficiently set up and reproduced for testing multiple electronic devices 10, across multiple testing systems 51, across multiple manufacturing plants, and so on. With this in mind, FIG. 13 is a perspective diagram of the testing system 51 illustrating positioning and orienting the test antenna 62 and reducing path loss between the antennas 47 and the test antenna 62, according to embodiments of the present disclosure. In some embodiments, the test electronic device 54 may adjust a position of the test antenna 62 by moving or angling the test antenna 62 at different points along a first axis 102 and a second axis 104. The first axis 102 may be along a line connecting the front antenna 47A of the electronic device and a center point 103 (e.g., halfway across the width and halfway across the length) of the electronic device 10. The second axis 104 may be along a line connecting the top antenna 47B and the bottom antenna 47C of the electronic device. Additionally, the test electronic device 54 may rotate (e.g., in a direction 105) the test antenna 62 around a third axis 106. The third axis 106 may include an axis of maximum gain (maximum radiated power) of the test antenna 62, an axis of symmetry of the test antenna 62, and so on.

The test electronic device 54 may be communicatively coupled to and control one or more actuators (e.g., linear actuators, rotary actuators, and so on) to move, angle, rotate, and/or tilt the test antenna 62. In some embodiments, an external operator may move, angle, rotate, and/or tilt the test antenna 62 manually. The test electronic device 54 may utilize a laser alignment tool and/or an optical sensor (e.g., a camera) to project a laser point on the electronic device 10 to accurately move, angle, rotate, and/or tilt the test antenna 62 along the first axis 102 and/or the second axis 104. In particular, the test electronic device 54 may position the test antenna 62 to decrease or minimize a path loss in the RF signals received at the test antenna 62 from the antenna 47A and/or the antennas 47B, 47C via the reflectors 66.

Figure 14:
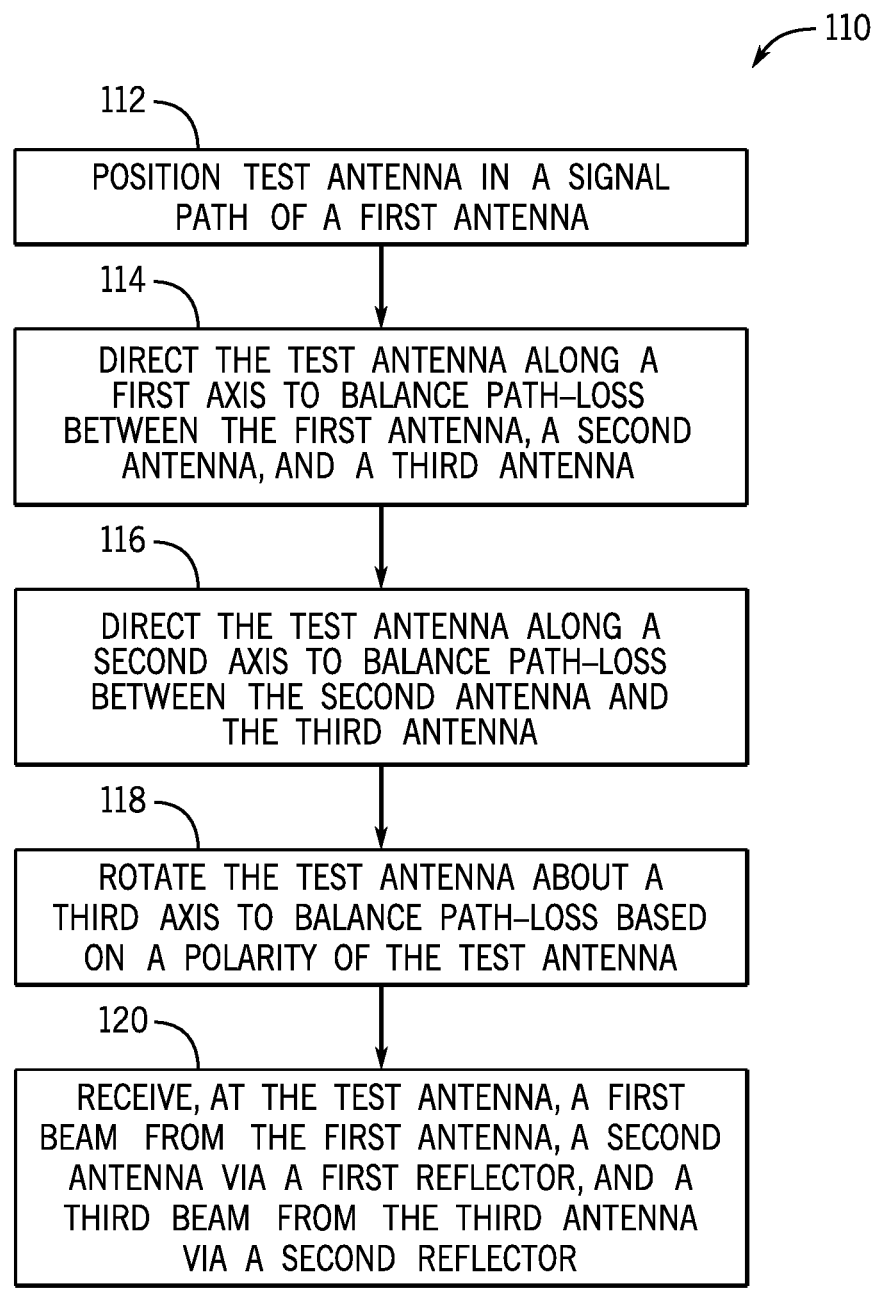
FIG. 14 is a method to decrease the path loss between antennas of the electronic device of FIG. 1 and the test antenna of the testing system of FIG. 8, according to an embodiment of the present disclosure.

With this in mind, FIG. 14 is a method 110 for decreasing or minimizing path loss between the antennas 47 of the electronic device 10 and the test antenna 62, according to embodiments of the present disclosure. Any suitable device (e.g., a controller) that may control components of the test electronic device 54, such as the processor 56, may perform the method 110. In some embodiments, the method 110 may be implemented by executing instructions stored in a tangible, non-transitory, computer-readable medium, such as the memory 58, using the processor 56. For example, the method 110 may be performed at least in part by one or more software components, such as an operating system, one or more software applications, and the like, of the test electronic device 54. While the method 110 is described using steps in a specific sequence, it should be understood that the present disclosure contemplates that the described steps may be performed in different sequences than the sequence illustrated, and certain described steps may be skipped or not performed altogether.

At block 112, the processor 56 of the test electronic device 54 moves or positions the test antenna 62 in the signal path 64 of a first antenna (e.g., 47A). In particular, the processor 56 may position the test antenna 62 in the direct signal path 64 of the first antenna 47A (e.g., along a boresight of the first antenna 47A). In some embodiments, the processor 56 may position the test antenna 62 by pointing the test antenna 62 straight down at the electronic device 10 (such that the axis of symmetry of the third axis 106 (e.g., axis of maximum gain (maximum radiated power) of the test antenna 62, the axis of symmetry of the test antenna 62) is normal to a surface (e.g., the first surface 48) of the electronic device 10, and moving the test antenna 62 such that it is positioned in the direct signal path 64 of the first antenna 47A while still pointing the test antenna 62 straight down at the electronic device 10.

At block 114, the processor 56 directs, angles, or tilts the test antenna 62 along a first axis 102 to balance path-loss of RF signals 46 transmitted by the first antenna (e.g., 47A), second antenna (e.g., 47B), and the third antenna (e.g., 47C). In particular, the processor 56 may balance the path loss of the RF signals 46 transmitted by the antennas 47 by maintaining a mounting point, tail or root 76 of the test antenna 62 while incrementally angling or tilting an opening 108 of the test antenna 62 at multiple points along the first axis 102 and determining the path loss at each point. The processor 56 may balance the path loss by any suitable technique. For example, the processor 56 may balance the path loss by determining a path loss for each antenna 47 at each point along the first axis 102, and determining an average, median, minimum, maximum, and so on, of the determined path losses for the antennas 47 at each point. The least resulting value may be the point of balanced path loss. In additional or alternative embodiments, weights may be applied to each path loss, and the balanced path loss may be based on the weighted and determined path losses. The free space path loss (FSPL) in decibels (dB) may be determined using Equation 1 below:

$$FSPL = 20\log_{10}(d) + 20\log_{10}(f) + 20\log_{10}\left(\frac{4\pi}{c}\right) - G_t - G_r \quad \text{(Equation 1)}$$

Equation 1 may include a distance (d) between a transmitting antenna (e.g., an antenna 47 of the electronic device 10) and a receiving antenna (e.g., test antenna 62), a frequency (f) of the transmitted signal, a transmitter gain ($G_t$), and a receiver gain ($G_r$). For example, the path loss when the test antenna 62 is 30 cm from the front-facing antenna 47A of the electronic device 10, for a signal transmitted from the front-facing antenna 47A having a frequency of 40 GHz, a gain of a transmitter of the electronic device 10 coupled to the front-facing antenna 47A being 0, and a gain of a receiver of the test electronic device 54 coupled to the test antenna 62 being 0, may be 54.02 dB. As another example, the path loss when the test antenna 62 is 15 cm from the front-facing antenna 47A of the electronic device 10, for a signal transmitted from the front-facing antenna 47A having a frequency of 40 GHz, a gain of a transmitter of the electronic device 10 coupled to the front-facing antenna 47A being 0, and a gain of a receiver of the test electronic device 54 coupled to the test antenna 62 being 0, may be 48.00 dB. Accordingly, the difference of 15 cm between the test antenna 62 and the front-facing antenna 47A, all other things being equal, may result in a difference in path loss of approximately 6 dB.

At block 116, the processor 56 directs, angles, or tilts the test antenna 62 along the second axis 104 to balance the path-loss between the second antenna (e.g., 47B) and the third antenna (e.g., 47C). It should be noted that, in some embodiments, the test antenna 62 may be angled along a line parallel to the second axis 104. In particular, similarly to block 114, the processor 56 may balance the path loss of the RF signal 46 transmitted by the antennas 47 by maintaining the mounting point 76 of the test antenna 62 while incrementally positioning the opening 108 of the test antenna 62 at multiple points along the second axis 104 and determine the path loss at each point. The processor 56 may balance the path loss by any suitable technique. For example, the processor 56 may balance the path loss by determining a path loss for each antenna 47B, 47C at each point along the second axis 104, and determining an average, median, minimum, maximum, and so on, of the determined path losses for the antennas 47 at each point. The least resulting value may be the point of balanced path loss. In additional or alternative embodiments, weights may be applied to each path loss, and the balanced path loss may be based on the weighted and determined path losses. The processor 56 may use Equation 1 when performing the path loss calculations.

At block 118, the processor 56 rotates the test antenna 62 orientation about a third axis 106 to balance path loss based on a polarity of the test antenna 62. In particular, any of the antennas 47 may operate (e.g., transmit an RF signal 46) using a vertical or horizontal polarization. Similarly, the test antenna 62 may operating (e.g., receive the RF signal 46) using a vertical or horizontal polarization. In particular, the test antenna 62 may use a vertical polarization to receive an RF signal 46 sent by an antenna 47 of the electronic device 10 using a vertical polarization, and the test antenna 62 may use a horizontal polarization to receive an RF signal 46 sent by an antenna 47 of the electronic device 10 using a horizontal polarization. To balance path loss between the polarizations, the processor 56 may rotate the test antenna 62 incrementally in the direction 105 about the third axis 106 incrementally at multiple points, and determine the path loss when the test antenna 62 receives an RF signal 46 using vertical polarization, and determine the path loss when the test antenna 62 receives an RF signal 46 using horizontal polarization, at each point. The processor 56 may balance the path loss by determining an average, median, minimum, maximum, and so on, of the determined path losses at each point. The least resulting value may be the point of balanced path loss. In additional or alternative embodiments, weights may be applied to each path loss, and the balanced path loss may be based on the weighted and determined path losses. The processor 56 may use Equation 1 when performing the path loss calculations.

At block 120, the processor 56 may receive, at the test antenna 62, a first beam from the first antenna (e.g., 47A) via the direct signal path 64, a second beam from the second antenna (e.g., 47B) via a first reflection signal path 68A, a third beam from the third antenna (e.g., 47C) via a second reflection signal path 68B. In some embodiments, the test electronic device 54 may perform the method 150 to decrease or optimize path loss between each individual antenna 47 of the electronic device 10 and the test antenna 62. The path loss between each antenna 47 and the test antenna 62 may be less than a certain decibel value for scalability and efficiency (e.g., the path loss being less than 60 dB). In this manner, the method 110 may enable the test electronic device 54 to decrease or optimize path loss between the antennas 47 of the electronic device 10 and the test antenna 62.

Figure 15:
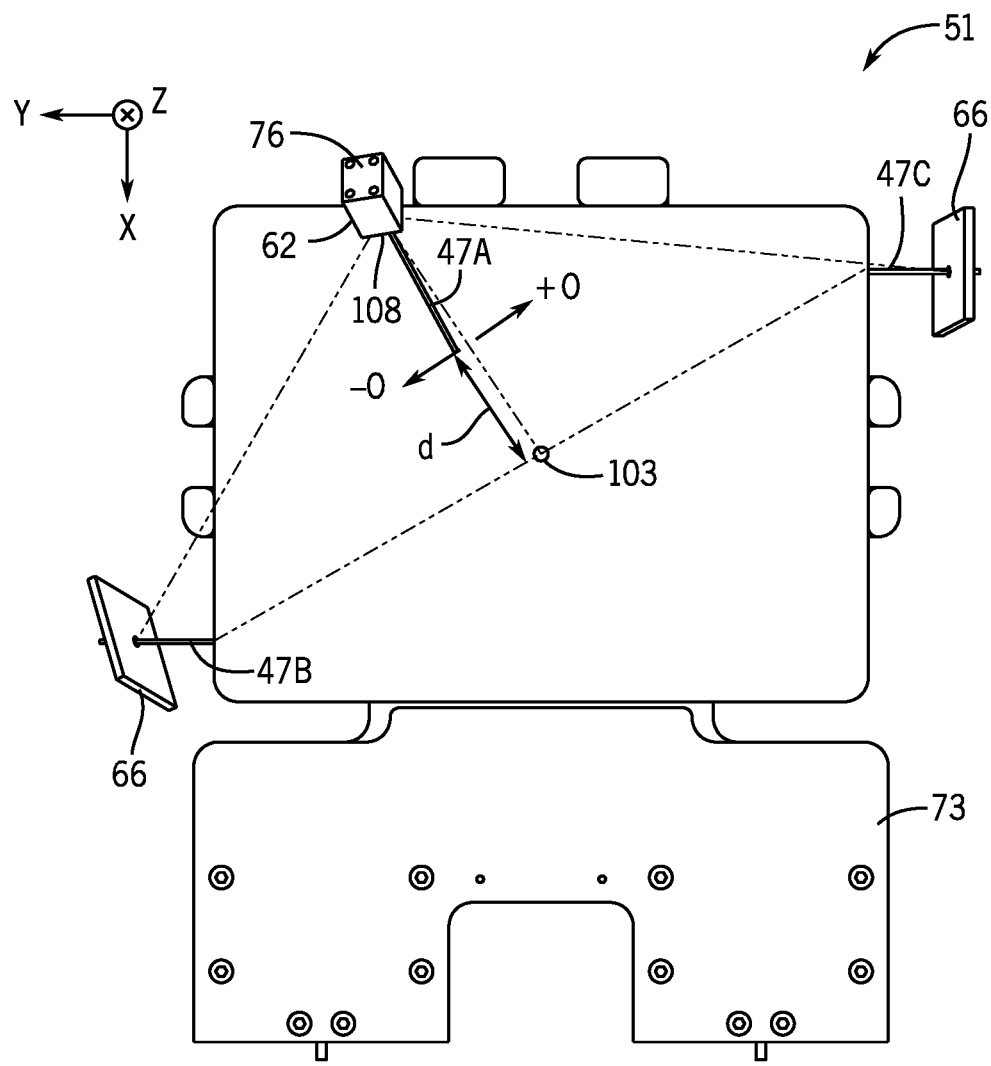
FIG. 15 is a perspective diagram of the testing system of FIG. 8 illustrating dimensional parameters for station replication, according to an embodiment of the present disclosure.

The method 110 may enable scalability in setting up multiple and repeated testing systems 51 for consistent and accurate testing results. To aid in the scalability of the testing system 51, the test electronic device 54 may utilize notation for station replication. With this in mind, FIG. 15 is a perspective diagram of the testing system 51 of FIG. 8 illustrating dimensional parameters of the notation for station replication, according to embodiments of the present disclosure. For example, the notation for station replication may include six different values (e.g., X, Y, Z, d, o, φ). The X value may indicate an X-axis offset of a mounting point, tail, or root 76 of the test antenna 62 from the front-facing antenna 47A. The Y value may indicate a Y-axis offset of the mounting point 76 of the test antenna 62 from the front-facing antenna 47A. The Z value may indicate a height of the test antenna 62 from the front-facing antenna 47A. The d value may indicate an angle or tilt of the test antenna 62 (e.g., maintaining the mounting point 76 of the test antenna 62 while pointing the opening 108 of the test antenna 62) along the first axis 102. The o value may indicate an angle or tilt of the test antenna 62 along the second axis 104. The φ value may indicate a polarization angle (e.g., in the direction 105 shown in FIG. 13) of the test antenna 62 about the third axis 106. An example of notation for station replication may include (3, 0, 3, 6, 0, 45°). In this example, the X-axis offset, the Y-axis offset, and the Z-axis offset of the tail of the test antenna 62 may equal 3 cm, 0, and 3 cm, respectively. Furthermore, the angle of the test antenna 62 along the first axis 102 and the angle of the test antenna 62 along the second axis 104 may equal 6 cm and 0, respectively. The polarization angle of the test antenna 62 may equal 45°.

While the method 110 is described as pertaining to the antennas 47A-C of the electronic device 10 illustrated in FIG. 8, it should be understood that the method 110 may be applied to electronic devices having more or less antennas 47, at more, less, or different locations of the electronic device 10. For instance, in some embodiments, the method 110 may apply to an electronic device having an antenna 47 at a side edge of the electronic device.

By employing the techniques described in the present disclosure, the systems and methods described herein may allow for the utilization of one or more reflectors 66 in combination with the test antenna 62 to test the antennas 47 of electronic devices 10. Further, different curvature designs of the reflectors 66 may be utilized to decrease or minimize energy loss and improve capturing of the RF signals 46. Moreover, the test electronic device 54 may adjust the position, angle, and rotation of the test antenna 62 to decrease or minimize path loss. Additionally, notation representing alignment of the test antenna 62 may enable quick and convenient replication to set up the testing system 51.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A testing system, comprising:
   a test electronic device comprising a test antenna configured to be disposed in a first signal path of a first antenna of an electronic device and receive a first signal from the first antenna;
   a first reflector configured to be disposed in a second signal path of a second antenna of the electronic device and reflect a second signal from the second antenna to the test antenna; and
   a second reflector configured to be disposed in a third signal path of a third antenna of the electronic device and reflect a third signal from the third antenna to the test antenna.

2. The testing system of claim 1, wherein the first antenna comprises a first antenna array, and wherein the second antenna comprises a second antenna array.

3. The testing system of claim 1, wherein the first reflector is configured to be disposed along a boresight of the second antenna.

4. The testing system of claim 1, wherein the electronic device is configured to operate the second antenna at a horizontal polarization and send the second signal at the horizontal polarization, and the test electronic device is configured to operate the test antenna at the horizontal polarization and receive the second signal at the horizontal polarization.

5. The testing system of claim 1, wherein the electronic device is configured to operate the second antenna at a vertical polarization and send the second signal at the vertical polarization, and the test electronic device is configured to operate the test antenna at the vertical polarization and receive the second signal at the vertical polarization.

6. A method for operating a testing system, comprising:
   positioning a test antenna of the testing system in a signal path of a first antenna of an electronic device;
   directing the test antenna along a first axis based on a first path loss between the first antenna, a second antenna, and a third antenna of the electronic device;

directing the test antenna along a second axis based on a second path loss between the second antenna and the third antenna;

receiving, at the test antenna:
- a first beam from the first antenna;
- a second beam from the second antenna via a first reflector of the testing system; and
- a third beam from the third antenna via a second reflector of the testing system.

7. The method of claim 6, comprising rotating the test antenna about a third axis based on a polarity of the test antenna.

8. The method of claim 6, wherein directing the test antenna along the first axis balances the first path loss between the first antenna, the second antenna, and the third antenna.

9. The method of claim 6, wherein the first axis is along a line connecting the first antenna and a center point of the electronic device.

10. The method of claim 6, wherein directing the test antenna along the second axis balances the second path loss between the second antenna and the third antenna.

11. The method of claim 6, wherein the second axis is along a line connecting the second antenna and the third antenna.

12. A testing system, comprising:
- a test electronic device comprising a test antenna configured to be disposed in a first signal path of a first antenna of an electronic device and receive a first signal from the first antenna; and
- a reflector configured to be disposed in a second signal path of a second antenna of the electronic device and reflect a second signal from the second antenna to the test antenna, wherein the electronic device is configured to:

operate the second antenna at a horizontal polarization and send the second signal at the horizontal polarization, and the test electronic device is configured to operate the test antenna at the horizontal polarization and receive the second signal at the horizontal polarization; or operate the second antenna at a vertical polarization and send the second signal at the vertical polarization, and the test electronic device is configured to operate the test antenna at the vertical polarization and receive the second signal at the vertical polarization.

13. The testing system of claim 12, wherein the first antenna comprises a first antenna array, and wherein the second antenna comprises a second antenna array.

14. The testing system of claim 12, wherein the reflector is configured to be disposed along a boresight of the second antenna.

15. The testing system of claim 12, wherein the test electronic device comprises a second reflector configured to be disposed in a third signal path of a third antenna of the electronic device and reflect a third signal from the third antenna to the test antenna.

16. The testing system of claim 12, wherein the test electronic device is communicatively coupled to and controls one or more actuators to move, angle, rotate, tilt, or any combination thereof, the test antenna.

17. The testing system of claim 12, wherein the test electronic device comprises a processor configured to measure characteristics of the first signal and the second signal.

18. The testing system of claim 17, wherein the processor is configured to generate one or more reports based on the characteristics.

19. The testing system of claim 18, wherein the test electronic device comprises a memory device, and wherein the processor is configured to store the one or more reports in the memory device.

* * * * *